No. 776,292.

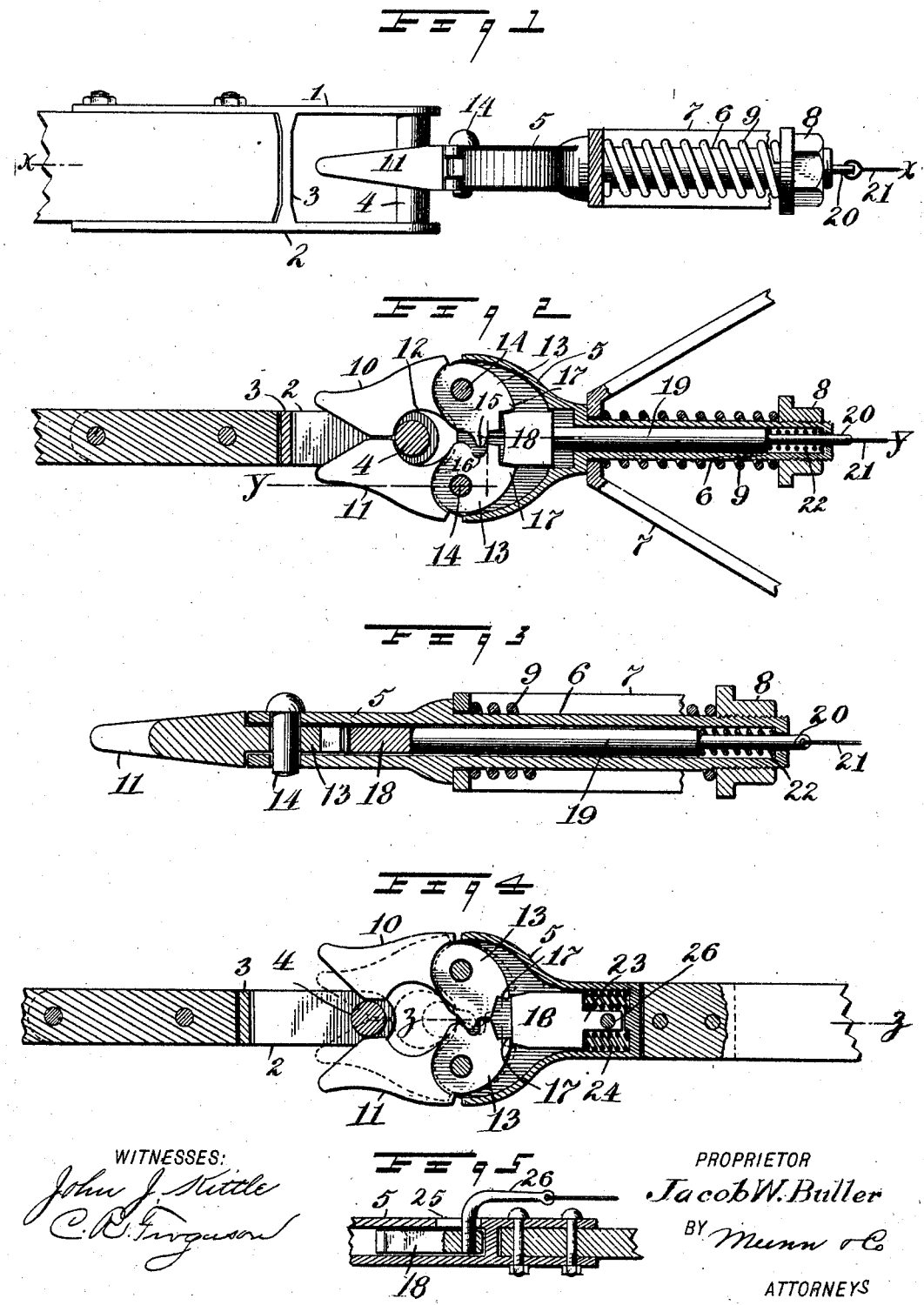

Patented November 29, 1904.

UNITED STATES PATENT OFFICE.

JACOB WIENS BULLER, OF JANSEN, NEBRASKA.

COUPLING.

SPECIFICATION forming part of Letters Patent No. 776,292, dated November 29, 1904.

Application filed August 3, 1904. Serial No. 219,328. (No model.)

*To all whom it may concern:*

Be it known that I, JACOB WIENS BULLER, a citizen of the United States, and a resident of Jansen, in the county of Jefferson and State of Nebraska, have invented a new and Improved Coupling, of which the following is a full, clear, and exact description.

This invention relates particularly to improvements in couplings for attaching a traction-engine to a device to be drawn—such as a threshing-machine, separator, tender, wagon, or the like—the object being to provide a coupling of novel and simple construction that will automatically move to and lock in closed position.

I will describe a coupling embodying my invention and then point out the novel features in the appended claims.

Reference is to be had to the accompanying drawings, forming a part of this specification, in which similar characters of reference indicate corresponding parts in all the figures.

Figure 1 is a side elevation of a coupling embodying my invention. Fig. 2 is a section on the line $x\ x$ of Fig. 1. Fig. 3 is a section on the line $y\ y$ of Fig. 2. Fig. 4 is a longitudinal section showing a modification, and Fig. 5 is a section on the line $z\ z$ of Fig. 4.

One member of the coupling, which is designed to be attached to a device to be drawn, consists of an upper plate 1 and a lower plate 2, connected by a cross-bar 3 to give sufficient strength, and arranged between them is a coupling-pin 4. The other member of the coupling, designed to be connected to a traction-engine or the like, consists of a hollow head 5, having a tubular shank 6 extended through an opening in bars 7, attached to the engine. Surrounding the shank 6 between the bars 7 and a nut 8 on the shank is a draft or buffer spring 9.

Pivotally connected to the head are the locking-jaws 10 11, the ends of which at the inner side are divergent, as clearly shown in the drawings, so that the coupling-pin may readily pass between them to separate the jaws. Inward of these divergent ends each jaw is provided with a substantially semicircular recess 12. The inner ends of the jaws are reduced in thickness, as indicated at 13, and pivot-pins 14 pass through these reduced portions and also through the upper and lower walls of the head. One of the reduced portions 13 has a tooth 15, designed to engage in a notch 16, formed in the other reduced portion 13. These portions 13 are also provided at their inner edges with shoulders 17, designed to be engaged by a sliding locking-block 18. This block 18 has a rod 19 extended from it into the tubular shank 6, and projected from the end of this rod 19 through an opening in the end wall of the shank 6 is a reduced portion 20, designed to be engaged by a rod or cable 21 for the purpose of drawing the locking-block out of engagement with the shoulders 17. The locking-block is pressed inward, however, by means of a spring 22, which engages the end of the rod 19 and also engages against the end wall of the shank 6.

In the example of my improvement shown in Figs. 4 and 5 the coupling-head is rigidly attached to a fixed portion of the engine, and in this case I employ the locking-block 18, having a short rod extension 23, around which is a spring 24, which forces the block forward to locking position.

Extended upward from the rod 23 through a slot 25 in the top wall of the coupling-head is a draw-rod 26, this draw-rod at its upper or outer portion being curved rearward.

In the operation when it is desired to release the first-described coupling member from the one having the jaws the block 18 is to be drawn out of engagement with the shoulders 17. Then as the engine moves along the coupling-pin 4 will cause the spreading of the jaws, so that the two connecting-sections will be readily released one from the other. At this time the end of the block 18 will be against the inner edge of the reduced portion 13, as indicated in Fig. 4, thus holding the jaws in open position. In the act of coupling as the pin 4 passes in between the jaws it will strike against the said jaws near the inner end, causing them to swing together and permitting the spring-pressed block 18 to pass into locking position, as indicated in Fig. 2. By the tooth-and-notch arrangement between the reduced portions of the jaws the said jaws are caused to operate in unison, even should the coupling-pin 4 engage with only one of the jaws as it passes inward.

Having thus described my invention, I claim as new and desire to secure by Letters Patent—

1. A coupling member comprising a head, jaws pivoted to the head and having shouldered portions extended into the head, interlocking devices on said shouldered portions, and a locking-block for engaging with said shoulders.

2. A coupling member comprising a hollow head, jaws pivoted to the head and having reduced shouldered portions extended into the head, interlocking devices on said shouldered portions, and a spring-pressed locking-block for engaging with said shoulders.

3. A coupling member comprising a hollow head, jaws having swinging connection with the head, the ends of said jaws at the inner side being divergent and the inner edges of said jaws inward of the divergent portions being concave, the reduced portions of the jaws extended into the hollow head and each provided with a shoulder, one of said reduced portions having a tooth, and the other of said reduced portions having a notch to receive the tooth, and a spring-pressed locking-block for engaging with the shoulders.

4. A coupling comprising a member having a hollow head, jaws having swinging connection with the head, said jaws having portions extended into the head and provided with shoulders, interlocking devices on said shouldered portions, a spring-pressed locking-block for engaging with the shoulders, and another coupling member having a pin for engaging between the jaws.

5. A coupling member comprising a hollow head having a tubular shank, a support through which the shank loosely passes, a spring connection between said support and the shank, jaws pivoted to the head and having interlocking shouldered portions extended into the head, a locking-block for engaging with said shoulders, a rod extended from said block into said tubular shank, a spring engaging with the inner end of said rod, and means connecting with said rod for drawing the locking-block out of its locking position.

In testimony whereof I have signed my name to this specification in the presence of two subscribing witnesses.

JACOB WIENS BULLER.

Witnesses:
BEN F. KNAPP,
LOUIS P. RICH.